Jan. 11, 1927.

G. E. CAMPBELL 1,614,421

SHAFT BEARING FOR BAND SAW MILLS

Filed May 16, 1924  4 Sheets-Sheet 1

Inventor;
George E. Campbell
By his Atty.

Jan. 11, 1927. 1,614,421
G. E. CAMPBELL
SHAFT BEARING FOR BAND SAW MILLS
Filed May 16, 1924  4 Sheets-Sheet 2

Jan. 11, 1927.

G. E. CAMPBELL 1,614,421

SHAFT BEARING FOR BAND SAW MILLS

Filed May 16, 1924   4 Sheets-Sheet 3

Inventor,
George E. Campbell
Vernan E. Hodges
By  his Atty.

Jan. 11, 1927.  G. E. CAMPBELL  1,614,421
SHAFT BEARING FOR BAND SAW MILLS
Filed May 16, 1924    4 Sheets-Sheet 4

Inventor;
George E. Campbell
Vernan E. Hodges
By          his Atty

Patented Jan. 11, 1927.

1,614,421

UNITED STATES PATENT OFFICE.

GEORGE E. CAMPBELL, OF CHATTANOOGA, TENNESSEE, ASSIGNOR TO THE WHELAND COMPANY, OF CHATTANOOGA, TENNESSEE, A CORPORATION OF TENNESSEE.

SHAFT BEARING FOR BAND-SAW MILLS.

Application filed May 16, 1924. Serial No. 713,707.

My invention relates to an improvement in shaft bearings, and more particularly for band-saw mills.

The object is to provide simple means for taking up wear and adjusting the bearing. Another object is to increase the durability as well as the efficiency of the bearing. The invention includes a sliding sleeve mounted in a box, which in turn is mounted on a trunnion, and the latter in turn being carried on a yoke, the base of which is mounted in a vertical column which permits rotation of the yoke at right-angles to the rotation of the trunnion on the yoke.

The invention further includes a sliding sleeve in connection with a trunnion-pin which passes through the box, and prevents the sliding sleeve from being entirely removed from the box before this pin is removed.

In the accompanying drawings:—

Figure 2:
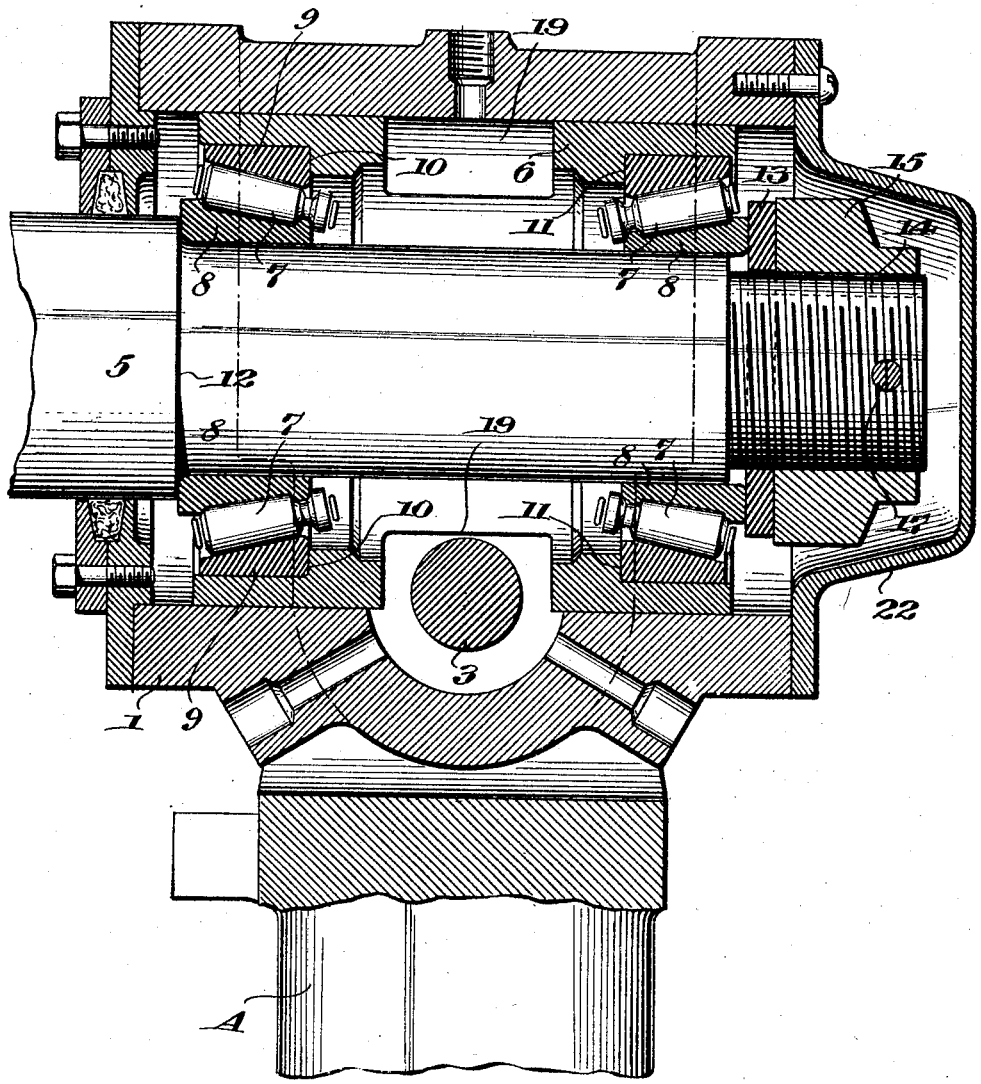
Figs. 2 and 3 are sections at right-angles to each other through a bearing.
Figure 3:
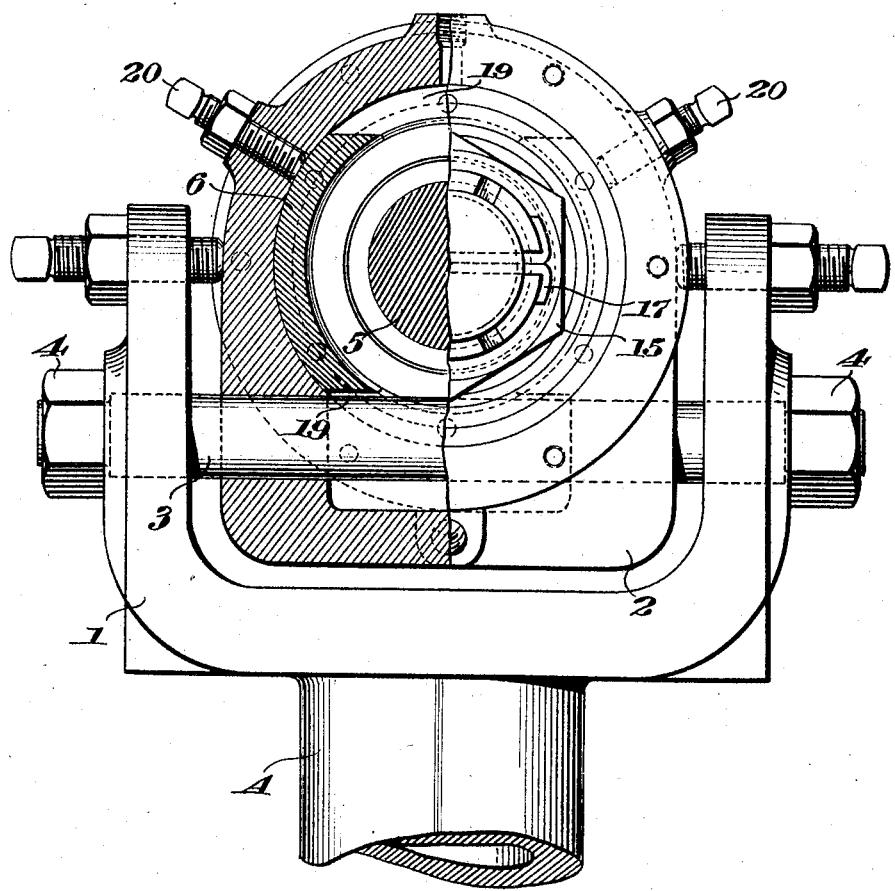
Figure 7:
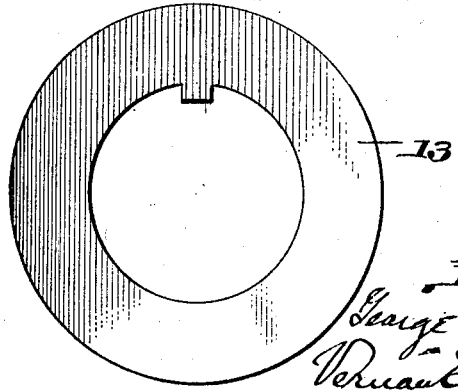
Fig. 7 is a side elevation of the adjusting collar.

The numeral 1 represents a yoke, the base of which is mounted in a vertical column A, allowing rotation of the yoke in one direction. 2, is a bearing-box held in the yoke by trunnion shaft 3 upon which the box is mounted and capable of turning on an axis at right-angles to that of the vertical column A; and the ends of the trunnion-shaft are held in the yoke by nuts 4 screwed on its opposite ends as viewed in Fig. 3. A band-saw wheel-shaft is represented by the numeral 5. The end of the shaft extends through the box 2 as shown in Fig. 2. A sleeve 6 is slidably mounted within the box, and interposed between the sleeve and the shaft are the tapered roller bearings 7, preferably rollers, the cones 8 and the races 9. While these bearings as shown are of the tapering type of roller, this is by no means necessary, and I do not care to be limited to any form of roller, or in fact a roller bearing at all, as ball-bearings might be employed.

The sleeve has internal shoulders 10 and 11, and the shaft has a shoulder 12. The inner set of bearings, including the race and cone, occupy the space between the shoulder 10 on the sleeve and the shoulder 12 on the shaft, and the outer bearings between the shoulder 11 on the sleeve and a washer or roller 13 actuated to slide on the threaded end 14 of the shaft. A nut 15 is screwed on the threaded end against the washer or collar for adjusting the bearings and taking up wear. The nut and washer at the end of the shaft are for the purpose of adjusting the bearings longitudinally on the shaft. It is by this means that any wear on the rollers or ball-bearings is taken up. When the nut is tightened against the end bearing, the adjustment is transmitted to the inside bearing due to the fact that the steel sleeve 6 is slidably mounted inside of the box 1 carrying the same.

The collar or washer 13 between the nut and the bearing is fitted with the dove-tail key 16 simply as a safety-device to prevent the nut from unscrewing should the bearing become loose on the shaft. The nut in turn is locked to the shaft after the adjustment is made by a cotter-pin 17 passing entirely through the shaft and the end of the nut. This affords a simple means for adjusting and taking up any wear which may occur in the bearings.

Figure 6:
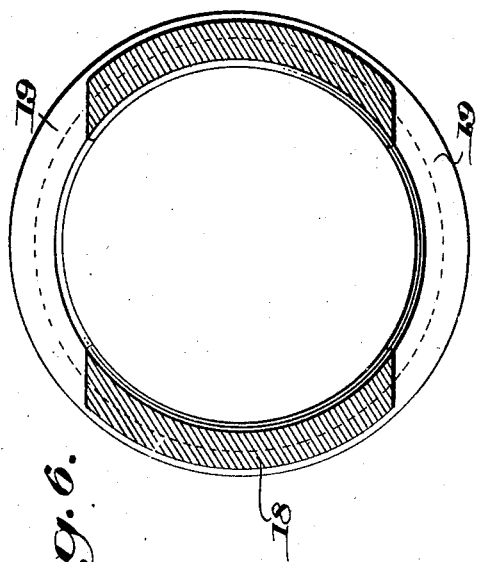
Fig. 6 is a transverse section through the center of the sleeve.
Figure 5:
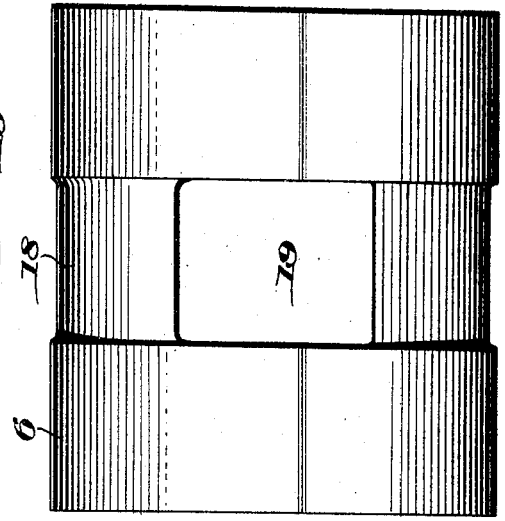
Fig. 5 is a view of the sleeve at right-angles to Fig. 4.
Figure 4:
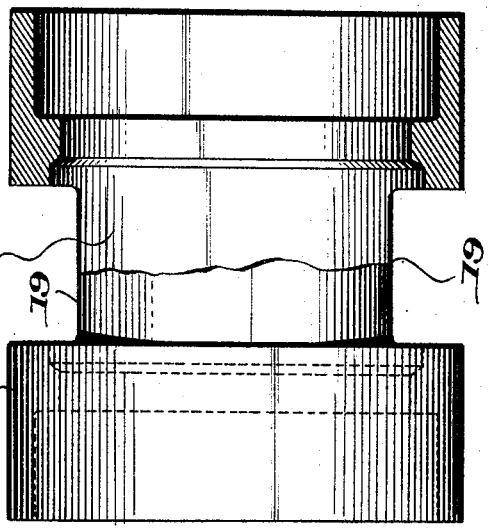
Fig. 4 is a view of the sliding sleeve partly in section.

The sleeve 6 is reduced through the center as shown at 18 in Figs. 4 and 5, and symmetrical notches 19 are cut through at opposite sides of the center of the sleeve as shown in Figs. 3 and 6. This is done because all of the wear in the cups of tapered roller-bearings comes on the bottom of the cups or races, and very little wear comes on the top. By removing the trunnion pin or shaft 3, the sleeve 6 may be given a half turn in the box, and the life of the bearing may, in that way, be doubled. In other words, the position of the sleeve is reversed, the bottom half being turned to the top, and the top to the bottom, simply by giving the sleeve a half revolution.

The trunnion-pin 3 also performs the function of preventing the sleeve 6 from rotating. As explained, the sleeve 6 itself has a sliding fit in the box 2. After the nut 15 on the end of the shaft is adjusted, and the bearings are properly fitted and tightened, the last thing to be done is to lock the sleeve 6 by tightening the two set-screws 20 (see Fig. 3). This is done in order to prevent any thrust which may come upon the shaft from pushing the sleeve entirely through the box. In the event that these set-screws should work loose, the entire end movement of the shaft would be blocked as soon as it came in contact with the trunnion pin or shaft 3 which passes through the box 2 and the lower notch 19 of the sleeve.

Figure 1:
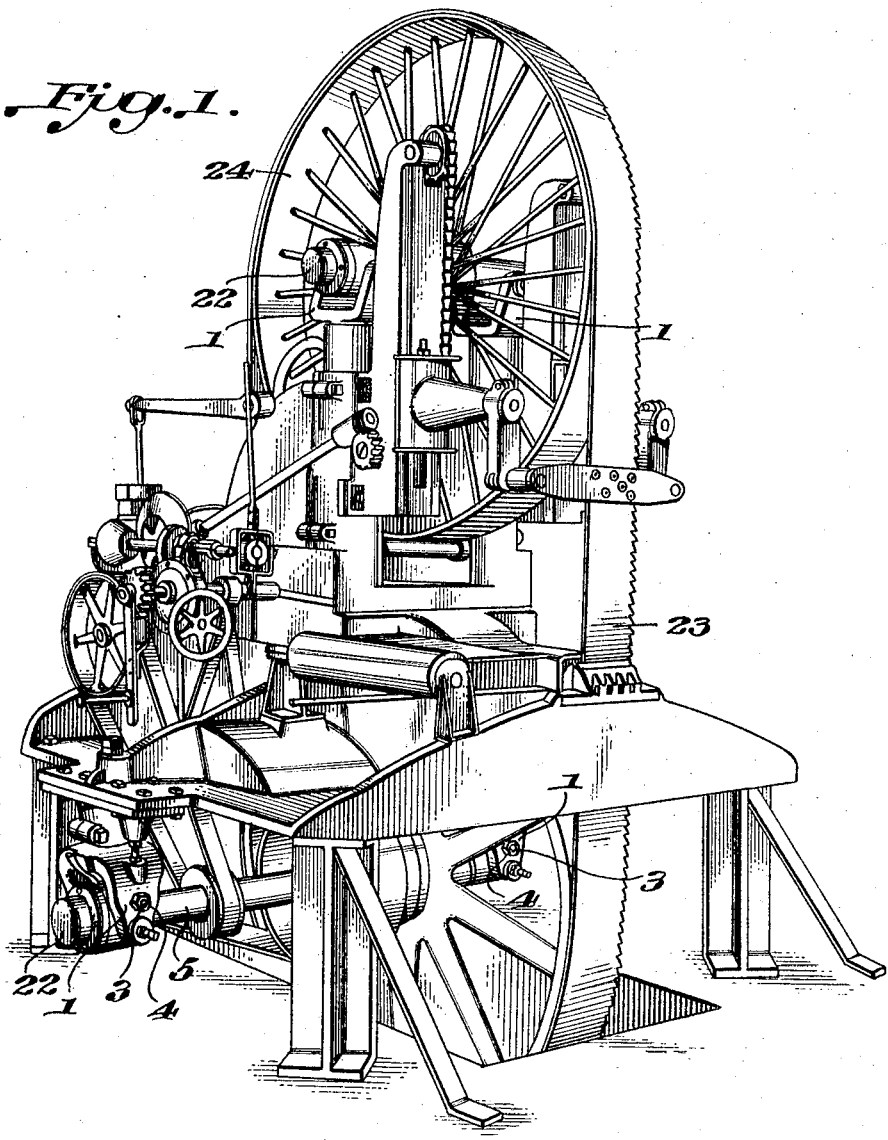
Fig. 1 is a perspective view of the invention as applied to a band-saw mill.

A cap 22 is secured over the end of the shaft, as shown in Figs. 1 and 2.

On the band saw-mill illustrated in Fig. 1, there are four of these yokes and bearing boxes 2, all of which are exactly alike. In order to keep the saw 23 running on the wheels, it is necessary to raise one or the other of the top boxes on each end of the shaft which carries the upper wheel 24. This is accomplished by means (not shown) whereby the shaft is tilted to keep the saw on the wheel. Sometimes it is necessary to raise one box 2 as much as an inch higher than the other box and in order to prevent the bearings from binding on the shaft the trunnion-pin or shaft 3 is employed. The boxes 2 freely hinge on these trunnions so that no binding is possible. It is understood that one of these trunnion pins or shafts runs entirely through each box. When one box is raised higher than its fellow, there would necessarily be a trifle more distance from center to center of the boxes than there would be when the shaft is perfectly level. So again, in order to prevent the bearings from cramping, recourse is had to the sliding sleeve 6.

This sleeve is slidably fitted in the box, and by the use of this sleeve it is impossible to load one bearing heavier than the other. Thus when it is necessary to adjust these bearings to take up the wear, the nut on each end of the shaft is all that has to be adjusted. This end forces the bearings in each box together until just the proper rotating clearance is provided. It will be noticed that as the nut is tightened, the outside anti-friction bearings will first become tight between cone and race, but, due to the slidability of the sleeve 6, if the inner bearing should be loose between its cone and race, the sleeve 6 will cause an equalization of pressure, with the result that there is always the same clearance for both sets of anti-friction bearings due to the sliding fit of the sleeve. In other words, when the nut on the end of the shaft is tightened, the single nut adjusts both bearings with one nut adjustment, precisely as though a single bearing were being adjusted. This is a great advantage to the mill-man who is not always familiar with this type of bearing installation.

By the use of the nut at each end of the shaft, the sleeve in one box is held fast by the two set-screws 20, so that all thrust on this shaft is carried on one box, while the sleeve in the other box may do all the sliding for both bearings.

After the sleeves are in place, the trunnion-shaft or pin 3 is then put in. This trunnion-shaft or pin not only acts as a pivot on which the box can freely oscillate, but it also holds the sleeve in the box, that is, it prevents the sleeve from rotating, and, should the set-screws become loose for any cause, the trunnion prevents the sleeves from moving endwise to any great extent, as with slight movement they would come in contact with the trunnions and be prevented from moving further. In this way the trunnion shaft or pin acts really as a safeguard against accident.

I claim:

1. The combination of a casing, a support for said casing, and a trunnion pin extending through the casing and into the support, for pivotally connecting the support and casing together, and for limiting the movement of the sleeve.

2. The combination of a casing, a sleeve mounted therein, and having a notched side, a shaft mounted in said casing, a support for the casing, and a trunnion pin extending through the casing and the notch in the sleeve and into the support, for pivotally connecting the support and casing together and for limiting the movement of the sleeve.

3. The combination of a casing, a longitudinally movable sleeve mounted therein and having a notched side, a shaft mounted in said sleeve, bearings interposed between the shaft and sleeve, a support for the casing and a trunnion pin extending through the casing and the notch in the sleeve and into the support at its opposite ends, for pivotally connecting said support and casing together and for limiting the longtudinal movement of the sleeve.

4. The combination of a casing, a sleeve mounted therein and having notches formed in the opposite sides thereof, a support for the casing, and a trunnion pin extending through the casing and at least one of the notches in the sleeve and into the support for pivotally connecting the support and casing together and for limiting substantial movement of the sleeve.

5. The combination of a shaft, a yoke, a box, a sleeve in the box and having a notched side, and a trunnion pin extending into the yoke and through the box, pivotally connecting them together, and through the notch in the sleeve to prevent substantial movement thereof.

6. The combinaion of a yoke, a casing, a trunnion pin pivotally supporting the casing in the yoke, and a sleeve mounted in said casing and having a notch therein, said trunnion pin extending into the notch to prevent substantial movement of the sleeve.

7. The combination of a yoke, a casing, a trunnion pin pivotally supporting the casing in the yoke, a sleeve mounted in said casing, and having a notch therein, said trunnion pin extending into the notch to prevent substantial movement of the sleeve, a shaft mounted in the sleeve, and bearings interposed between the shaft and sleeve.

8. The combination of a casing, a sleeve mounted therein and having a notch formed in the side thereof, a shaft mounted in said sleeve, a support for the casing, and a trunnion pin extending through the casing and notch in the sleeve and into the support at its opposite ends, for pivotally connecting the support and casing together and for limiting the longitudinal and rotary movement of the sleeve.

9. The combination of a support, a casing, a sleeve mounted in the casing and having notches formed in diametrically opposite sides thereof, a shaft mounted in the sleeve, bearings interposed between the shaft and sleeve, and a trunnion pin extending into at least one of the notches to prevent substantial movement of the sleeve.

10. The combination of a support, a casing, a sleeve movably mounted in the casing and having notches formed in diametrically opposite sides thereof, a shaft mounted in the sleeve, roller bearings interposed between the shaft and sleeve, and a trunnion pin removably extending into one of the notches to prevent substantial rotary movement of the sleeve and to permit the sleeve to be reversed upon removal thereof.

11. The combination of a support, a casing, a sleeve movably mounted in the casing and having notches formed in diametrically opposite sides thereof, a shaft mounted in the sleeve, roller bearings interposed between the shaft and sleeve, and a trunnion pin removably extending through the casing and one of the notches in the sleeve and into the support to prevent substantial longitudinal and turning movement of the sleeve and to permit the sleeve to be reversed diametrically upon removal of the pin.

12. The combination of a shaft, a yoke, a box, a slidable sleeve, bearings between the sleeve and shaft, the sleeve having a notched side, and a trunnion pin or bolt extending through the yoke and box and pivotally connecting them together and through the notch in the sleeve, whereby to prevent the latter from turning and limit its endwise movement.

13. The combination of a shaft, a yoke, a box, a slidable sleeve, bearings between the sleeve and shaft, the sleeve having a notched side, a trunnion pin or bolt extending through the yoke and box and pivotally connecting them together and through the notch in the sleeve, whereby to prevent the latter from turning and limit its endwise movement, and set-screws for locking the sleeve in the box.

14. The combination with a yoke, a box, a notched sleeve sliding in the box, a trunnion extending through the box, a notch in the sleeve and into the yoke for pivotally connecting the box and yoke and limiting the movement of the sleeve within the box in two directions.

15. The combination with a yoke mounted and capable of turning on a vertical column, a box, a notched sleeve sliding in the box, a trunnion extending through the box, a notch in the sleeve and into the yoke for pivotally connecting the box and yoke and limiting the movement of the sleeve within the box in two directions.

16. The combination with a yoke, a box, a notched sleeve sliding in the box, a trunnion extending through the box, a notch in the sleeve and into the yoke for pivotally connecting the box and yoke and limiting the movement of the sleeve within the box in two directions, and means for taking up the wear in the bearings by moving the sleeve endwise, and means for locking the sleeve in the box.

17. The combination of a yoke, a casing, a sleeve movable in the casing and having a notch in the side thereof, a trunnion pin extending through the casing and notch in the sleeve and into the yoke for pivotally connecting te casing and yoke together and for limiting the movement of the sleeve, said sleeve having shoulders therein adjacent the outer ends thereof, a shaft mounted in the sleeve, and bearings interposed between the shaft and the shoulders in the sleeve.

18. The combination of a yoke, a casing, a sleeve movable in the casing and having a notch in the side thereof, a trunnion pin extending through the casing and notch in the sleeve and into the yoke for pivotally supporting the casing in the yoke and for limiting the movement of the sleeve, said sleeve having shoulders therein adjacent the outer ends thereof, a shaft mounted in the sleeve, having a shoulder formed thereon and having a threaded outer end, an adjusting nut screwed onto said threaded end, and roller bearings interposed between the shoulders in the sleeve and the shoulder and adjusting nut on the shaft.

In testimony whereof I affix my signature.

GEORGE E. CAMPBELL.